United States Patent
Galvane et al.

(10) Patent No.: US 12,554,331 B2
(45) Date of Patent: Feb. 17, 2026

(54) ADAPTATION OF A HAPTIC SIGNAL TO DEVICE CAPABILITIES

(71) Applicant: InterDigital CE Patent Holdings, SAS, Paris (FR)

(72) Inventors: Quentin Galvane, Thorigne-Fouillard (FR); Fabien Danieau, Rennes (FR); Philippe Guillotel, Vern sur Seiche (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 93 days.

(21) Appl. No.: 18/715,834

(22) PCT Filed: Nov. 17, 2022

(86) PCT No.: PCT/EP2022/082289
§ 371 (c)(1),
(2) Date: Jun. 3, 2024

(87) PCT Pub. No.: WO2023/099233
PCT Pub. Date: Jun. 8, 2023

(65) Prior Publication Data
US 2025/0036203 A1    Jan. 30, 2025

(30) Foreign Application Priority Data
Dec. 3, 2021   (EP) .................................... 21306705
Mar. 18, 2022  (EP) .................................... 22305319

(51) Int. Cl.
*H04B 3/36*   (2006.01)
*G06F 3/01*   (2006.01)

(52) U.S. Cl.
CPC .................................... *G06F 3/016* (2013.01)

(58) Field of Classification Search
CPC ............................... G06F 3/016; A63F 13/285
See application file for complete search history.

(56) References Cited

U.S. PATENT DOCUMENTS

| 10,748,391 | B2   | 8/2020 | Grant et al. |
| 11,086,398 | B2 * | 8/2021 | Gonzalez Franco ... G06T 15/00 |
| 2013/0117377 | A1 * | 5/2013 | Miller .................... A63F 13/92 709/205 |

(Continued)

OTHER PUBLICATIONS

"Final Call for Proposals on the Coded Representation of Haptics", International Organization for Standardization (ISO), ISO/IEC JTC 1/SC 29/WG 2, MPEG Technical Requirements, m56455_v6, Online, Apr. 2021, 31 pages.

(Continued)

*Primary Examiner* — Toan N Pham
(74) *Attorney, Agent, or Firm* — Klintworth & Rozenblat LLP

(57) ABSTRACT

A data structure storing information representative of an immersive experience comprises information representative of the haptic capabilities of a reference haptic rendering device. Therefore, haptic signals may be adapted to the capabilities of a different rendering device with different haptic capabilities. Such adaptation may be performed directly at the rendering stage by the rendering device itself. A transcoding process allows the generation of a new data structure for a rendering device with different haptic capabilities.

17 Claims, 9 Drawing Sheets

(56) References Cited

U.S. PATENT DOCUMENTS

2016/0012690 A1\* 1/2016 Cruz-Hernandez ..... G06F 3/016
340/407.1
2017/0131774 A1\* 5/2017 Keller .................... G06F 3/011
2018/0200619 A1 7/2018 Guillotel et al.

OTHER PUBLICATIONS

Holland et al., "The IEEE 1918.1 "Tactile Internet" Standards Working Group and its Standards", Institute of Electrical and Electronics Engineers (IEEE), Proceedings of the IEEE, vol. 107, Issue No. 2, Feb. 2019, 24 pages.
"Information Technology—Coding of Audio-visual Objects—Part 12: ISO Base Media File Format", International Organization for Standardization (ISO), ISO/IEC 14496-12, Fifth edition, Feb. 20, 2015, 256 pages.
"Vibration Motor", Precision Microdrives, Product Catalogue, 2021, 25 pages.
"Haptics", Tactile Labs Inc., Products list, Oct. 2021, 5 pages.

\* cited by examiner

ADAPTATION OF A HAPTIC SIGNAL TO DEVICE CAPABILITIES

CROSS REFERENCE TO RELATED APPLICATIONS

This application is a U.S. National Stage Application under 35 U.S.C. § 371 of International Patent Application No. PCT/EP2022/082289, filed Nov. 17, 2022, which is incorporated herein by reference in its entirety.

This application claims priority to European Application Nos. (i) 21306705.1, filed Dec. 3, 2021, and (ii) 22305319.0 filed Mar. 18, 2022, each of which is incorporated herein by reference in its entirety.

TECHNICAL FIELD

At least one of the present embodiments generally relates to haptics and more particularly to the adaptation of a haptic signal to device capabilities.

BACKGROUND

Fully immersive user experiences are proposed to users through immersive systems based on feedback and interactions. The interaction may use conventional ways of control that fulfill the need of the users. Current visual and auditory feedback provide satisfying levels of realistic immersion. Additional feedback can be provided by haptic effects that allow a human user to perceive a virtual environment with his senses and thus get a better experience of the full immersion with improved realism. However, haptics is still one area of potential progress to improve the overall user experience in an immersive system.

Conventionally, an immersive system may comprise a 3D scene representing a virtual environment with virtual objects localized within the 3D scene. To improve the user interaction with the elements of the virtual environment, haptic feedback may be used through stimulation of haptic actuators. Such interaction is based on the notion of "haptic objects" that correspond to physical phenomena to be transmitted to the user. In the context of an immersive scene, a haptic object allows to provide a haptic effect by defining the stimulation of appropriate haptic actuators to mimic the physical phenomenon on the haptic rendering device. Different types of haptic actuators allow to restitute different types of haptic feedbacks.

An example of a haptic object is an explosion. An explosion can be rendered though vibrations and heat, thus combining different haptic effects on the user to improve the realism. An immersive scene typically comprises multiple haptic objects, for example using a first haptic object related to a global effect and a second haptic object related to a local effect.

The principles described herein apply to any immersive environment using haptics such as augmented reality, virtual reality, mixed reality or haptics-enhanced video (or omnidirectional/360° video) rendering, for example, and more generally apply to any haptics-based user experience. A scene for such examples of immersive environments is thus considered an immersive scene.

Haptics refers to sense of touch and includes two dimensions, tactile and kinesthetic. The first one relates to tactile sensations such as friction, roughness, hardness, temperature and is felt through the mechanoreceptors of the skin (Merkel cell, Ruffini ending, Meissner corpuscle, Pacinian corpuscle). The second one is linked to the sensation of force/torque, position, motion/velocity provided by the muscles, tendons and the mechanoreceptors in the joints. Haptics is also involved in the perception of self-motion since it contributes to the proprioceptive system (i.e. perception of one's own body). Thus, the perception of acceleration, speed or any body model could be assimilated as a haptic effect. The frequency range is about 0-1 KHz depending on the type of modality. Most existing devices able to render haptic signals generate vibrations. Examples of such haptic actuators are linear resonant actuator (LRA), eccentric rotating mass (ERM), and voice-coil linear motor. These actuators may be integrated into haptic rendering devices such as haptic suits but also smartphones or game controllers.

To encode haptic signals, several formats have been defined related to either a high level description using XML-like formats (for example MPEG-V), parametric representation using json-like formats such as Apple Haptic Audio Pattern (AHAP) or Immersion Corporation's HAPT format, or waveform encoding (IEEE 1918.1.1 ongoing standardization for tactile and kinesthetic signals). The HAPT format has been recently included into the MPEG ISOBMFF file format specification (ISO/IEC 14496 part 12). Moreover, GL Transmission Format (glTF™) is a royalty-free specification for the efficient transmission and loading of 3D scenes and models by applications. This format defines an extensible, common publishing format for 3D content tools and services that streamlines authoring workflows and enables interoperable use of content across the industry.

Moreover, a new haptic file format is being defined within the MPEG standardization group and relates to a coded representation for haptics. The Reference Model of this format is not yet released but is referenced herein as RM0. With this reference model, the encoded haptic description file can be exported either as a JSON interchange format (for example a .gmpg file) that is human readable or as a compressed binary distribution format (for example a .mpg) that is particularly adapted for transmission towards haptic rendering devices.

A challenge in the domain of haptics is the adaptation of signals to different haptic devices. Haptic experiences are usually device specific, but each haptic device has unique specifications and capabilities (type of motor, frequency range, maximum amplitude, etc.). A haptic file description may define signals that are perfectly suited to some devices but do not render well on other devices with different capabilities and limitations. Being able to adapt a signal to a new device is a key challenge in haptic.

Embodiments described hereafter have been designed with the foregoing in mind.

SUMMARY

Embodiments are related to a data structure storing information representative of an immersive experience and comprising information representative of the haptic capabilities of a reference haptic rendering device. Therefore, haptic signals may be adapted to the capabilities of a different rendering device with different capabilities. Such adaptation may be performed directly at the rendering stage by the rendering device or may result in the generation of a new data structure for a different rendering device.

A first aspect of at least one embodiment is directed to a method comprising, for a haptic effect, obtaining haptic data for the haptic effect, the haptic data comprising information representative of metadata related to capabilities of a reference rendering device for which the haptic effect was designed for, and a description of a low-level signal for rendering the haptic effect when provided to the reference rendering device, obtaining metadata related to capabilities of a reference rendering device, comparing the capabilities of the reference rendering device to the capabilities of a target rendering device, determining if an adaptation of the low-level signal is to be performed and responsively adapting the low-level signal to the capabilities of the target rendering device, and providing the adapted haptic data.

A second aspect of at least one embodiment is directed to a device comprising a processor configured to, for a haptic effect, obtain haptic data for the haptic effect, the haptic data comprising information representative of metadata related to capabilities of a reference rendering device for which the haptic effect was designed for, and a description of a low-level signal for rendering the haptic effect when provided to the reference rendering device, obtaining metadata related to capabilities of a reference rendering device, compare the capabilities of the reference rendering device to the capabilities of a target rendering device, determine if an adaptation of the low-level signal is to be performed and responsively adapt the low-level signal to the capabilities of the target rendering device, and provide the adapted haptic data.

A third aspect of at least one embodiment is directed to a data structure comprising haptic data, the haptic data comprising, for a haptic effect, information representative of metadata related to capabilities of a reference rendering device for which the haptic effect was designed for, a description of a low-level signal for rendering the haptic effect when provided to the reference rendering device.

A fourth aspect of at least one embodiment is directed to a non-transitory computer readable medium comprising haptic data comprising, for a haptic effect, information representative of metadata related to capabilities of a reference rendering device for which the haptic effect was designed for, a description of a low-level signal for rendering the haptic effect when provided to the reference rendering device.

According to a fifth aspect of at least one embodiment, a computer program comprising program code instructions executable by a processor is presented, the computer program implementing at least the steps of a method according to the first aspect.

According to a sixth aspect of at least one embodiment, a computer program product which is stored on a non-transitory computer readable medium and comprises program code instructions executable by a processor is presented, the computer program product implementing at least the steps of a method according to the first aspect.

DETAILED DESCRIPTION

Figure 1:
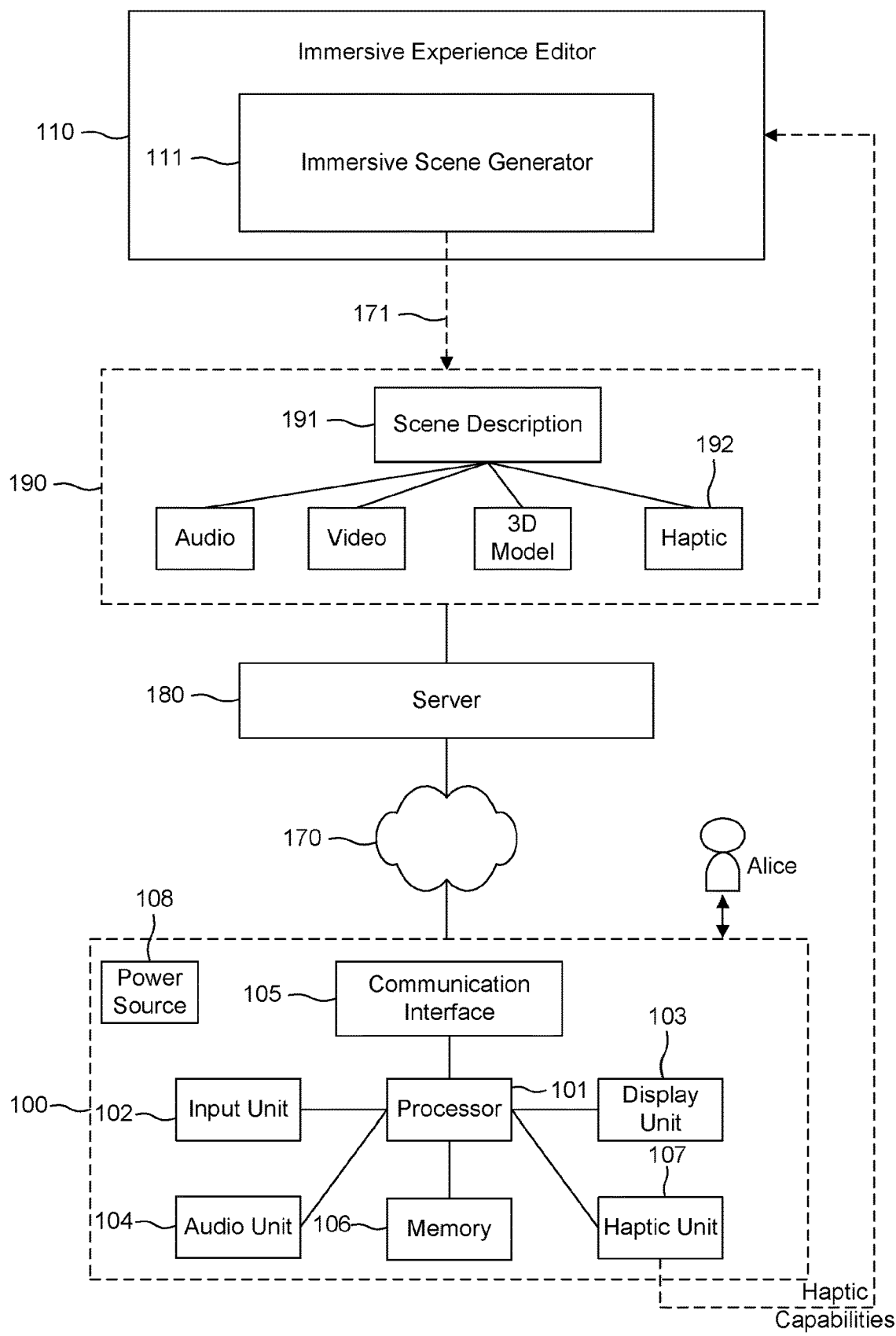
FIG. 1 illustrates a block diagram of an example of a system in which various aspects and embodiments are implemented.

FIG. 1 illustrates a block diagram of an example of system in which various aspects and embodiments are implemented. In the depicted immersive system, the user Alice uses the haptic rendering device 100 to interact with a server 180 hosting an immersive scene 190 through a communication network 170. This immersive scene 190 may comprise various data and/or files representing different elements (scene description 191, audio data, video data, 3D models, and haptic description file 192) required for its rendering. The immersive scene 190 may be generated under control of an immersive experience editor 110 that allows to arrange the different elements together and design an immersive experience. Appropriate description files and various data files representing the immersive experience are generated by an immersive scene generator 111 in a format adapted for transmission to haptic rendering devices. The immersive experience editor 110 is typically performed on a computer that will generate immersive scene to be hosted on the server. For the sake of simplicity, the immersive experience editor 110 is illustrated as being directly connected through the dotted line 171 to the immersive scene 190. In practice, the computer running the immersive experience editor 110 is connected to the server 180 through the communication network 170.

In at least one embodiment, the immersive scene generator 111 takes into account the capabilities (and limitations) of the haptic rendering device 100.

The haptic rendering device 100 comprises a processor 101. The processor 101 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor may perform data processing such as haptic signal decoding, input/output processing, and/or any other functionality that enables the device to operate in an immersive system.

The processor 101 may be coupled to an input unit 102 configured to convey user interactions. Multiple types of inputs and modalities can be used for that purpose. Physical keypad or a touch sensitive surface are typical examples of input adapted to this usage although voice control could also be used. In addition, the input unit may also comprise a digital camera able to capture still pictures or video. The processor 101 may be coupled to a display unit 103 configured to output visual data to be displayed on a screen. Multiple types of displays can be used for that purpose such as a liquid crystal display (LCD) or organic light-emitting diode (OLED) display unit. The processor 101 may also be coupled to an audio unit 104 configured to render sound data to be converted into audio waves through an adapted transducer such as a loudspeaker for example. The processor 101 may be coupled to a communication interface 105 configured to exchange data with external devices. The communication preferably uses a wireless communication standard to provide mobility of the haptic rendering device, such as cellular (e.g. LTE) communications, Wi-Fi communications, and the like. The processor 101 may access information from, and store data in, the memory 106, that may comprise multiple types of memory including random access memory (RAM), read-only memory (ROM), a hard disk, a subscriber identity module (SIM) card, a memory stick, a secure digital (SD) memory card, any other type of memory storage device. In embodiments, the processor 101 may access information from, and store data in, memory that is not physically located on the device, such as on a server, a home computer, or another device.

The processor 101 may be coupled to a haptic unit 107 configured to provide haptic feedback to the user, the haptic feedback being described in the haptic description file 192 that is related to the scene description 191 of an immersive scene 190. The haptic description file 192 describes the kind of feedback to be provided according to the syntax described further hereinafter. Such description file is typically conveyed from the server 180 to the haptic rendering device 100. The haptic unit 107 may comprise a single haptic actuator or a plurality of haptic actuators located at a plurality of positions on the haptic rendering device. Different haptic units may have a different number of actuators and/or the actuators may be positioned differently on the haptic rendering device.

In at least one embodiment, the haptic unit 107 is configured to implement a haptic signal adaptation process according to embodiments described further below. In at least one embodiment, the processor 101 is configured to implement a haptic signal adaptation process according to embodiments described further below. The haptic signal adaptation process allows to adapt the low-level signal to the capabilities of the haptic unit. Herein the term low-level signal refers to the signal (typically an analog signal) that is applied to a haptic actuator to render the haptic effect. Such low-level signal may be represented using different forms, for example by metadata or parameters in the description file or by using a digital encoding of a sampled analog signal (e.g. PCM or LPCM).

The processor 101 may receive power from the power source 108 and may be configured to distribute and/or control the power to the other components in the device 100. The power source may be any suitable device for powering the device. As examples, the power source may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

While the figure depicts the processor 101 and the other elements 102 to 108 as separate components, it will be appreciated that these elements may be integrated together in an electronic package or chip. It will be appreciated that the haptic rendering device 100 may include any sub-combination of the elements described herein while remaining consistent with an embodiment. The processor 101 may further be coupled to other peripherals or units not depicted in FIG. 1 which may include one or more software and/or hardware modules that provide additional features, functionality and/or wired or wireless connectivity. For example, the peripherals may include sensors such as a universal serial bus (USB) port, a vibration device, a television transceiver, a hands free headset, a Bluetooth® module, a frequency modulated (FM) radio unit, a digital music player, a media player, a video game player module, an Internet browser, and the like. For example, the processor 101 may be coupled to a localization unit configured to localize the haptic rendering device within its environment. The localization unit may integrate a GPS chipset providing longitude and latitude position regarding the current location of the haptic rendering device but also other motion sensors such as an accelerometer and/or an e-compass that provide localization services.

Typical examples of haptic rendering device 100 are haptic suits, smartphones, game controllers, haptic gloves, haptic chairs, haptic props, motion platforms, etc. However, any device or composition of devices that provides similar functionalities can be used as haptic rendering device 100 while still conforming with the principles of the disclosure.

In at least one embodiment, the device does not include a display unit but includes a haptic unit. In such embodiment, the device does not render the scene visually but only renders haptic effects. However, the device may prepare data for display so that another device, such as a screen, can perform the display. Example of such devices are haptic suits or motion platforms.

In at least one embodiment, the device does not include a haptic unit but includes a display unit. In such embodiment, the device does not render the haptic effect but only renders the scene visually. However, the device may prepare data for rendering the haptic effect so that another device, such as a haptic prop, can perform the haptic rendering. Examples of such devices are smartphones, head-mounted displays, or laptops.

In at least one embodiment, the device does not include a display unit nor does it includes a haptic unit. In such embodiment, the device does not visually render the scene and does not render the haptic effects. However, the device may prepare data for display so that another device, such as a screen, can perform the display and may prepare data for rendering the haptic effect so that another device, such as a haptic prop, can perform the haptic rendering. Examples of such devices are desktop computers, optical media players, or set-top boxes.

In at least one embodiment, the immersive scene 190 and associated elements are directly hosted in memory 106 of the haptic rendering device 100 allowing local rendering and interactions.

Although the different elements of the immersive scene 190 are depicted in FIG. 1 as separate elements, the principles described herein apply also in the case where these elements are directly integrated in the scene description and not separate elements. Any mix between two alternatives is also possible, with some of the elements integrated in the scene description and other elements are separate files.

Embodiments introduce a process for adapting a haptic signal, for example comprised in haptic data carried by a haptic description file, to the capabilities of a haptic rendering device. This process may be implemented directly by the haptic rendering device itself, for example by the processor or the haptic unit of the haptic rendering device. This process may also be implemented when generating the haptic description file, for example within the immersive scene generator of an immersive experience editor. This process is made possible by the insertion, within a haptic description file, of metadata related to haptic capabilities of a reference rendering device thus allowing to adapt the values of the haptic signal to a different device with different capabilities.

The reference rendering device is for example the device for which the haptic signals were designed. The reference rendering device may also be a theoretical device of common knowledge or a historical device of significant importance. Multiple reference devices may be used in the haptic description file, for example one being adapted to linear displacement, another to temperatures, etc. The point is that the values of the haptic signals carried by the haptic description file are particularly well adapted to this reference device.

The capabilities are related to physical characteristics of the haptic actuators and may be specific for a given type of actuator and the corresponding haptic effect (for example frequency range, amplitude of displacement, maximal acceleration, resonating frequencies, dynamic range, location on the body, weight, size, type of motor, maximum voltage, maximum current, impedance, etc).

Figure 2A:
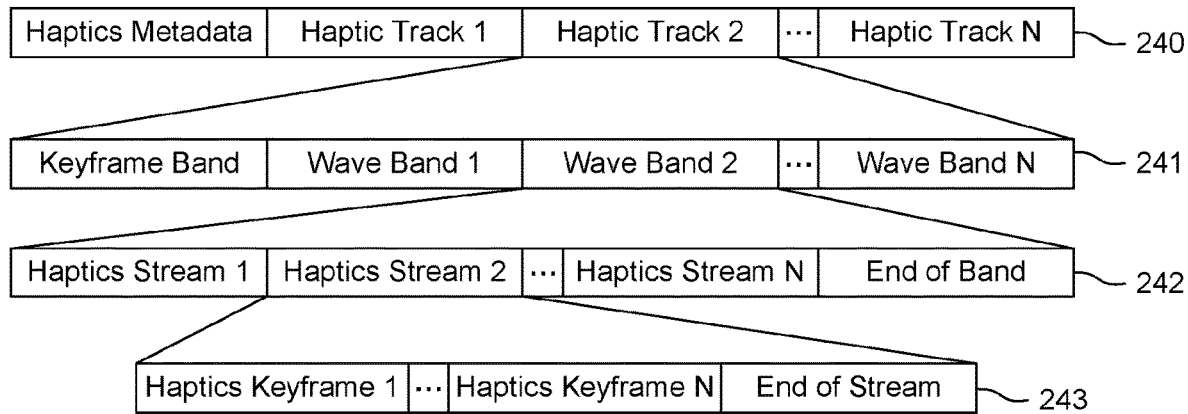
FIG. 2 illustrates an example of architecture for an encoder 200 for haptic files according to at least one embodiment.
Figure 2B:
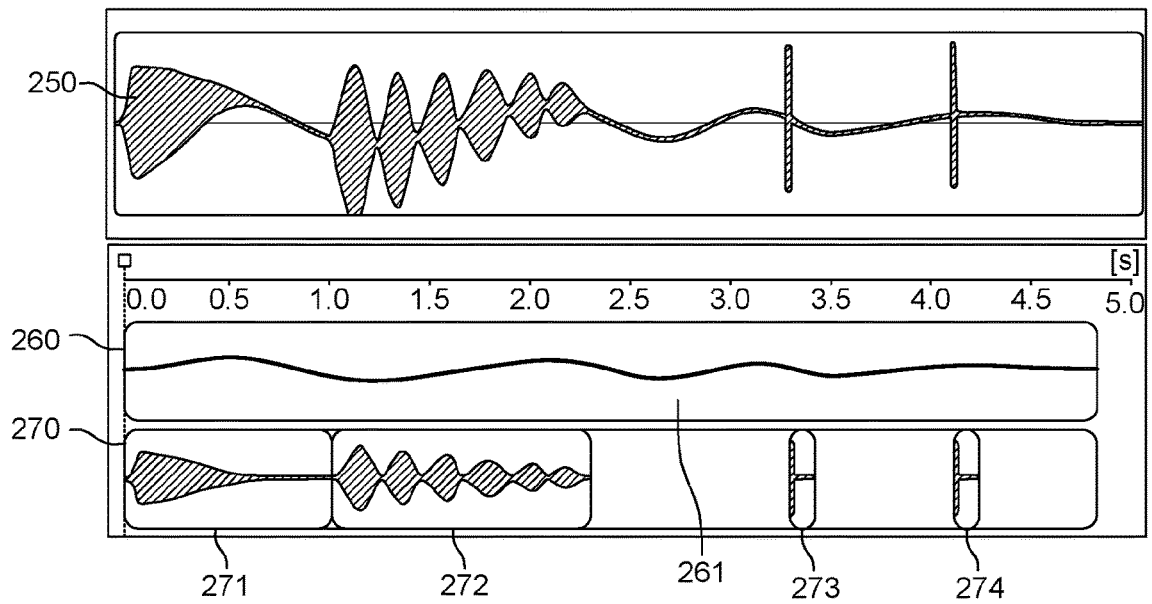

FIGS. 2A and 2B illustrate an example of encoding of a low-level haptic signal based to a conventional technique using a decomposition into frequency bands. As shown in FIG. 2A, with this technique, a signal is encoded using a list of tracks 240 where the data is decomposed in a set of frequency bands 241. Each band defines part of the signal in a given frequency range with a list of streams. The streams 242 comprises a plurality of unitary signal keyframes 243 and handle their timing. The haptic signal in a track can be reconstructed by combining the data from the streams in the different bands. FIG. 2B shows a haptic signal 250 and a possible decomposition in two frequency bands. The band 260 is related to the first frequency band and only comprises one stream 261. The band 270 is related to the second frequency band and comprises the streams 271, 272, 273 and 274. Each stream is comprising a set of keyframes representing the values of the signal to be rendered. Temporal references such as timestamps are associated to the keyframes. By aggregating keyframes of the streams of high and low frequency bands positioned at the appropriate timestamp, the original low-level signal can be reconstructed.

One advantage of this solution with regards to the structure is that the signal data is easy to package and particularly convenient for streaming purposes Indeed, with such linear structure, the data can be easily broken down to small consecutive packages and does not require complicated data-pre-fetching operations. The signal is easily reconstructed by patching the packages back together to ensure a smooth playback of the signal.

It will be appreciated that modifications (i.e. adaptation) of the low-level signal may be done through modifications of the elements representing the low-level signal (i.e. wave bands, streams, keyframes).

Wavelets may be used as an alternative to keyframes but still based on the same principle.

Figure 2C:
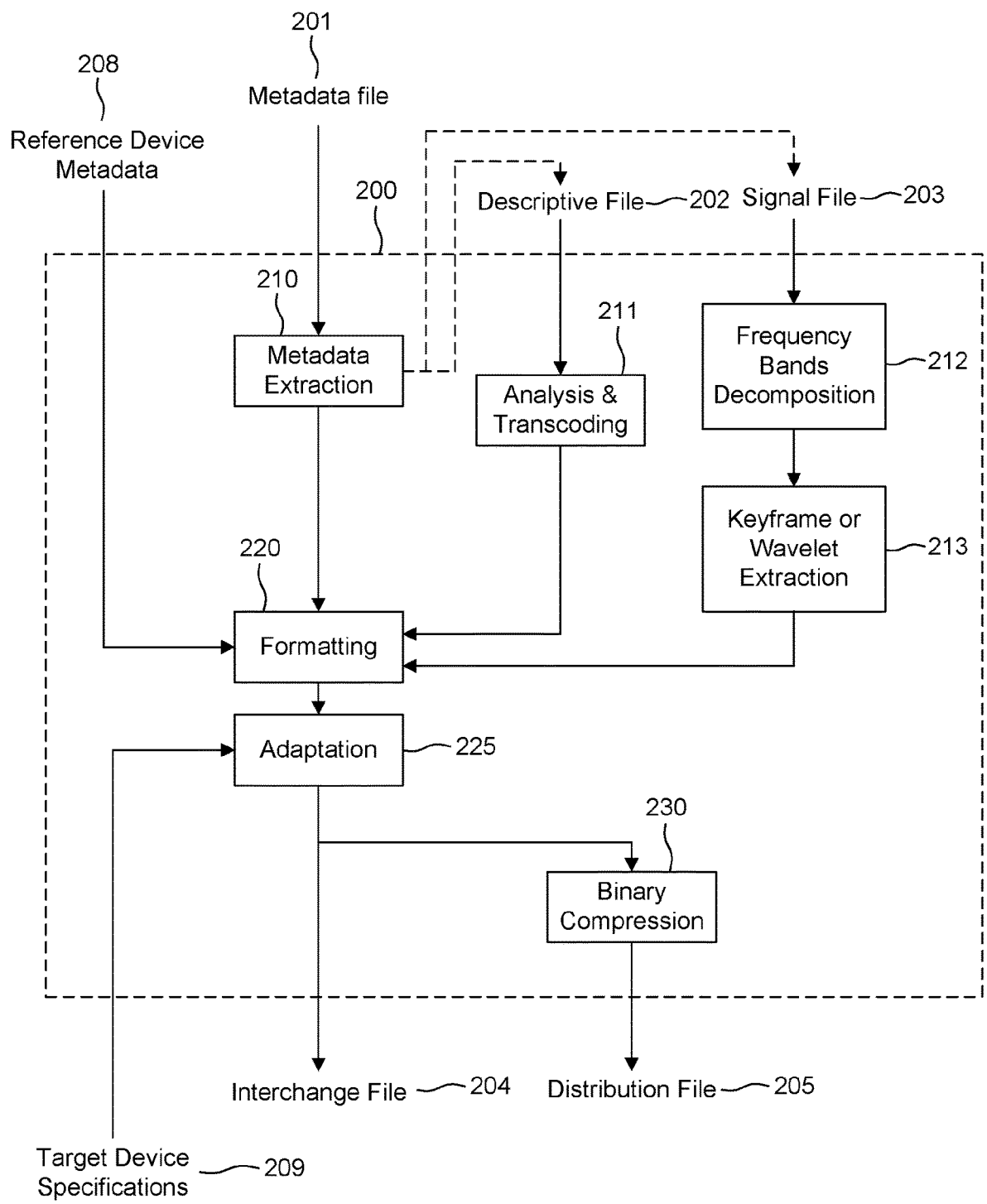

FIG. 2C illustrates an example of architecture for an encoder 200 for haptic files according to at least one embodiment. The inputs are a metadata file 201 and at least one signal file 203. The metadata file 201 is for example based on the 'OHM' haptic object file format. The signal files are conventionally using PCM encoded files for example based on the WAV file format. The descriptive files 202 are for example based on the AHAP or HAPT file formats. The interchange file 204 is a human readable file for example based on glTF, XML or JSON formats. The distribution file 205 is a binary encoded file for example based on MPEG file formats adapted for streaming or broadcasting to a decoder device.

Metadata is extracted 210 from the metadata file 201, allowing to identify the descriptive files and/or signal files. Descriptive files are analyzed and transcoded in step 211. In step 212, signal files are decomposed in frequency bands and keyframes or wavelets are extracted in step 213. The interchange file 204 is then generated in step 220, in compliance with the data format according to one of the embodiments described herein. The formatting takes into account reference device metadata 208 comprising information related to the capabilities of the reference haptic device used for defining the haptic signals. Data based on these metadata 208 are inserted into the interchange file and may use the syntax described hereunder. An adaption process 225 may also be performed considering the target device specifications 209 and more particularly to the haptic rendering capabilities of the target device. This will generate an interchange file or distribution file adapted to the target device. The interchange file 204 may be compressed in step 230 to be distributed in a transmission-friendly form such as the distribution file 205, more compact than the interchange file format.

An adaptation process similar to the adaptation process 225 may be implemented by a haptic rendering device to adapt a received interchange file or distribution file to its own capabilities. For that purpose, the haptic rendering device obtains the data related to the reference haptic device capabilities and compares them to its own capabilities. For example, when differences exist with regards to ranges, amplitudes, frequencies of operation of the haptic actuators of the haptic rendering device with regards to the reference device, the haptic rendering device performs the adaptation so that the haptic signal is modified to better suit the capabilities of the device.

Figure 3:
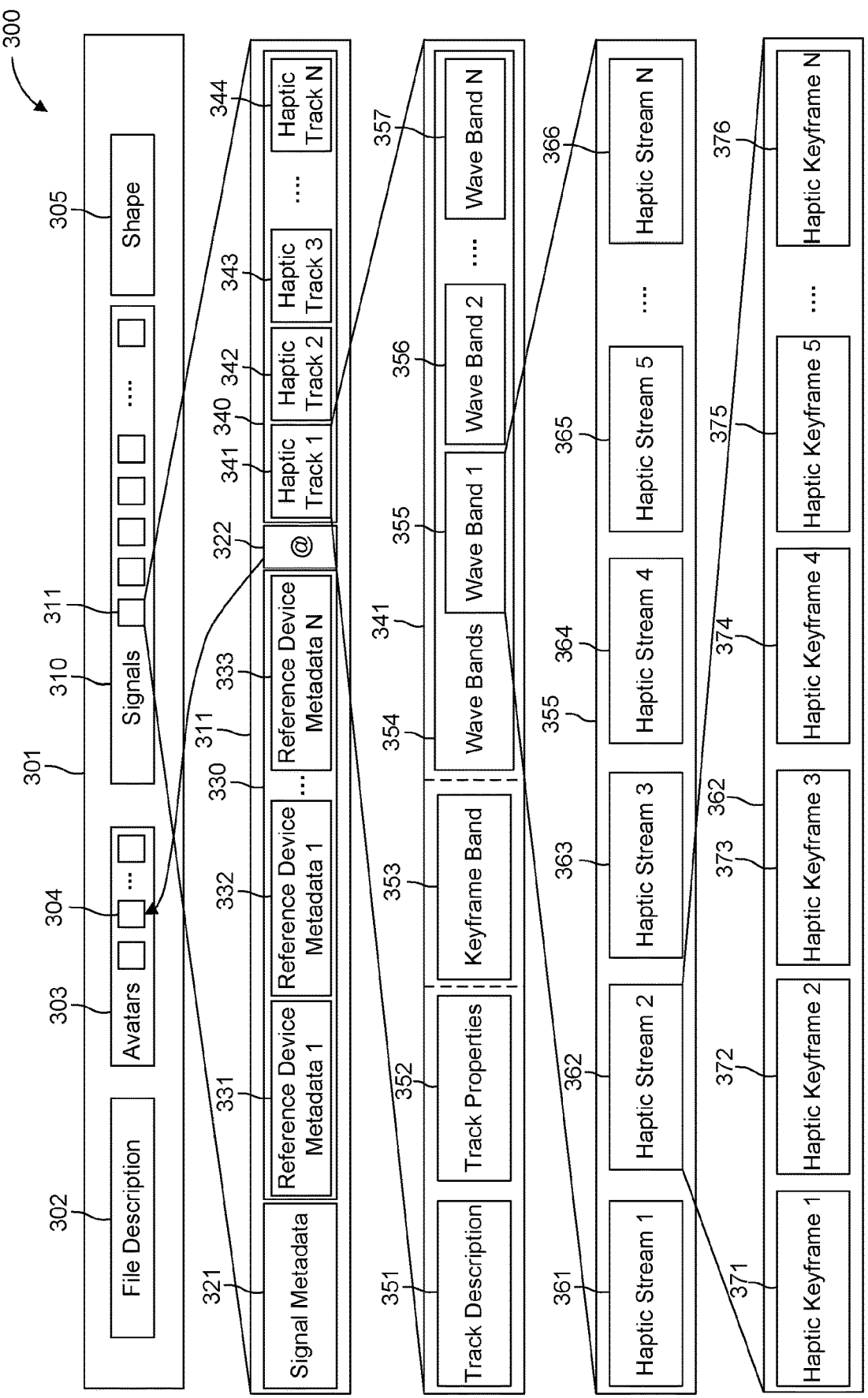
FIG. 3 illustrates an example of data structure for haptic files data according to embodiments.

FIG. 3 illustrates an example of data structure for haptic files data according to embodiments. The haptic description file 300 (in other words, the haptic data) comprises a first level 301 comprising a file description 302, a set of avatars 303, a set of signals 310 and a shape 305. The file description 302 comprises some generic metadata including the version of the file, the date and a description of the associated haptic experience. The set of avatars 303 comprises the definition of body models on which a haptic effect is to be applied. The shape 305 determines the volume where the haptic effect is active within an immersive scene. Signals such as the signal 311 are aggregated into the set of signals 310. Despite its name, a signal is a relatively high-level concept that ties together haptic effects of similar categories (for example kinesthetic, temperature-based effect, etc.).

The signal 311 is expanded in the second line of the figure and comprises signal metadata 321, a reference 322 to an avatar selected in the set of avatars 303 (for example a reference to avatar 304), reference data 330 and a set of haptic tracks 340. The signal metadata 321 comprises information on the type of haptic effect and corresponding signal (Vibration, Pressure, Temperature, etc.) and as well as a description of the signal. The set of haptic tracks 340 aggregates several haptic tracks such as 341, 342, 343 and 344.

The reference data 330 comprises data representative of haptic capabilities of a reference haptic device that was used as reference model when designing the immersive experience. Therefore, the limitations of the haptic signal defined in the haptic keyframes are directly related to the capabilities of the reference model. The type of information depends on the type of haptic effect, as described in the tables below defining the syntax of the reference device metadata. The reference data 330 comprises a list of reference device metadata 331, 332, 333. Indeed, the file description may define multiple haptic effects potentially related to different types of haptic effects and therefore the reference device metadata may relate to different haptic actuators, hence the list of individual reference device metadata.

The example of haptic track 341 is expanded in the third line of the figure and comprises a track description 351, track properties 352, keyframe band 353 and a list 354 of wave bands for example 355, 356, 357. The example of wave band 355 is expanded in the fourth line of the figure and comprises a list of haptic streams 361 to 366. An example of haptic stream 362 is expanded in the bottom line and comprises a list of haptic keyframes 371 to 376 that defines the low-level haptic signal for a stream of a waveband. More particularly, a rendering device will combine the set of keyframes of the set of streams of the set of bands in order to recreate a low-level haptic signal corresponding to the complete haptic track and thus be able to render the haptic effect by providing this low-level haptic signal to the appropriate actuator.

The data structure illustrated in FIG. 3 is based on a representation of the low-level haptic signal as a decomposition into frequency bands of keyframes. The same principle would apply for other types of representation of the low-level haptic signal, although requiring some adaptation of some elements of the syntax. One example is the use of wavelets instead of keyframes. A second example is the use of a file-based PCM encoded signal.

Figure 4:
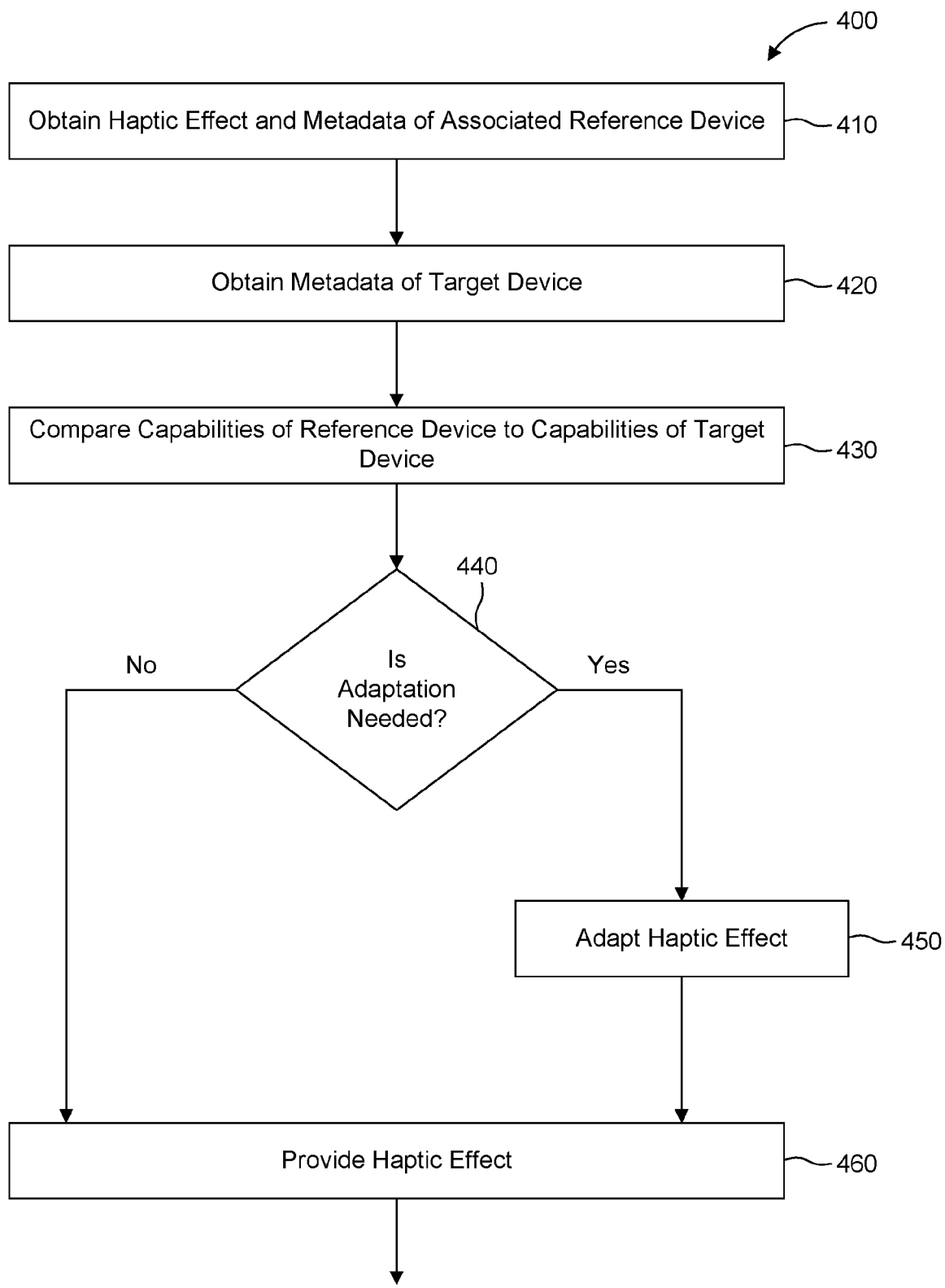
FIG. 4 illustrates an example of process for haptic signal device adaptation according to an embodiment.

FIG. 4 illustrates an example of process for haptic signal device adaptation according to an embodiment. This process 400 is for example implemented by the processor 101 of a haptic rendering device 100 of FIG. 1, thus corresponding to a situation where a haptic signal defined in a haptic description file is to be rendered by a haptic rendering device. The process 400 may also be implemented by a processor of a computer in a 'transcoding' situation where a haptic description file is to be rendered on a given target haptic rendering device (i.e. a different device than the device performing the adaptation). In this case, the haptic description file is updated: if needed (i.e., when the capabilities of target and reference device are different), the haptic effect is modified and the reference device metadata are replaced by metadata of the target haptic device, therefore the haptics description file will comprise haptic effects that are directly adapted to the capabilities of the target haptic device. The process 400 may be iterated over the plurality of haptic effects of a haptic description file or may be applied only to a subset of the haptic effects.

In step 410, the processor obtains, from a haptic description file, the haptic signal and the metadata of a reference haptic device associated to the obtained signal. The haptic description file uses for example the data structure introduced in FIG. 3. It may also use the syntax described in the tables below. Among other information, the haptic description file comprises, for a haptic effect to be rendered (and more particularly the corresponding haptic signal of the haptic effect), metadata related to the capabilities of a reference haptic rendering device for which the haptic effect was designed (and more particularly the corresponding haptic signal of the haptic effect).

In step 420, the processor obtains metadata related to the capabilities of the target device and compares them, in step 430, to the metadata related to the capabilities of the reference haptic rendering device. The comparison is done for example on values of parameters related to a given capability (in other words: comparing numbers between the capabilities of the reference rendering device and of the target rendering device).

In step 440, the processor determines if an adaptation of the haptic effect if needed. This step introduces some flexibility into the numerical comparison of step 430. Indeed, even if the values of the capabilities metadata for a given effect are strictly different, the processor may provide some tolerance and will only determine that an adaptation is required if the difference is important. This level of tolerance may be configurable and under control of the user of the device.

When an adaptation is required, in step 450, the process modifies the values and or parameters of the effect in order to perform the adaptation. Transcoding of haptic effects for a target device with different specifications is made possible by including the reference device metadata information in the encoded representation, i.e the haptic description file.

Regarding the haptic effect adaptation itself, a wide range of techniques may be used such as linear scaling, interpolation, frequency transposition, frequency range scaling, body location transposition, depending also on the type of effect.

In step 460, the processor provides the haptic effect, either to the target device, or the actuator itself or stores the modified haptic description file.

To illustrate the haptic adaptation process, we described hereunder multiple examples of haptic adaptation techniques: a first one based on the resonance frequency of the two actuators at a given voltage, a second one based on their frequency range and a third one based on a maximal value.

Figure 5:
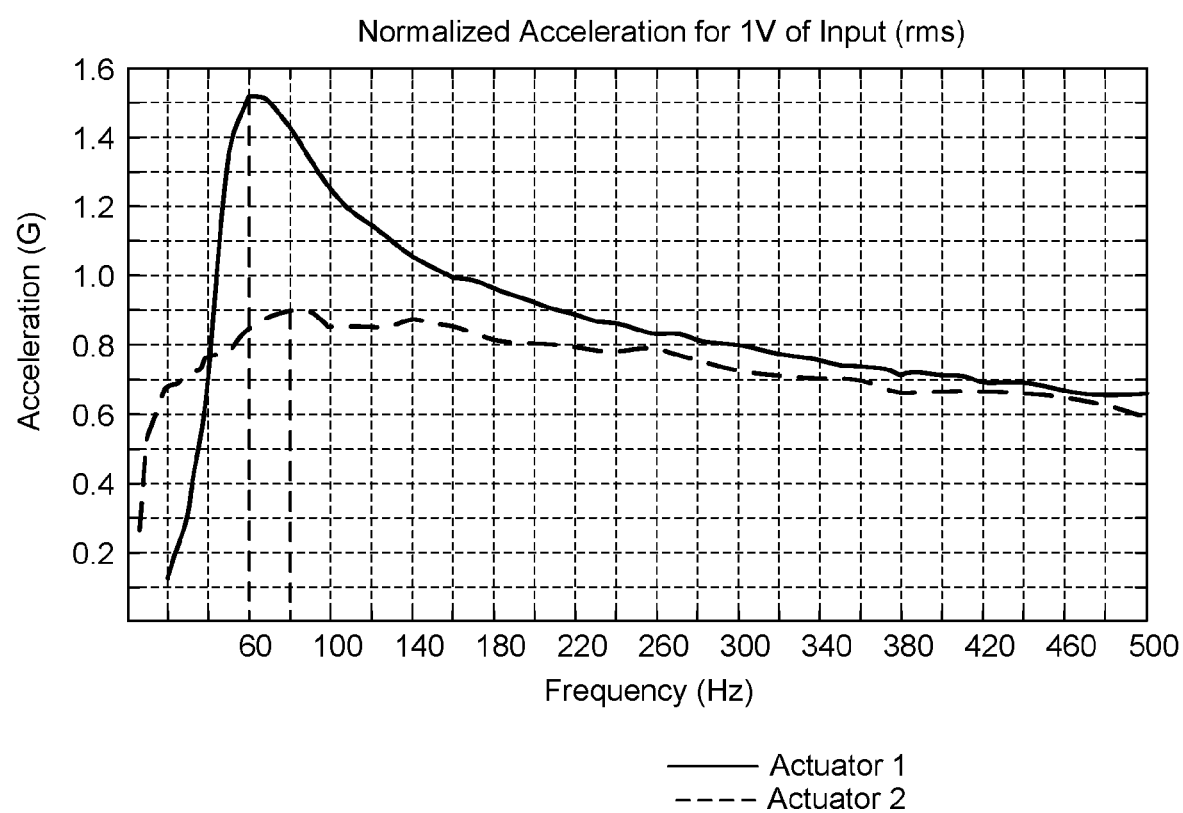
FIG. 5 illustrates an example of graph related to different capabilities of haptic rendering device.

FIG. 5 illustrates an example of graph related to different capabilities of haptic rendering device. This graph shows the acceleration response of different actuators used in different haptic rendering devices at a given input voltage for different frequencies and notably illustrates the resonance frequency of the two actuators at respectively 60 Hz and 80 Hz. This resonance frequency would correspond, in a haptic description file, to one metadata value representing the corresponding capability. Based on this observation, a possible solution to adapt the signal is to modify the frequency information of the input signal by shifting the signal frequency by the offset between the two resonance frequencies.

Figure 6A:
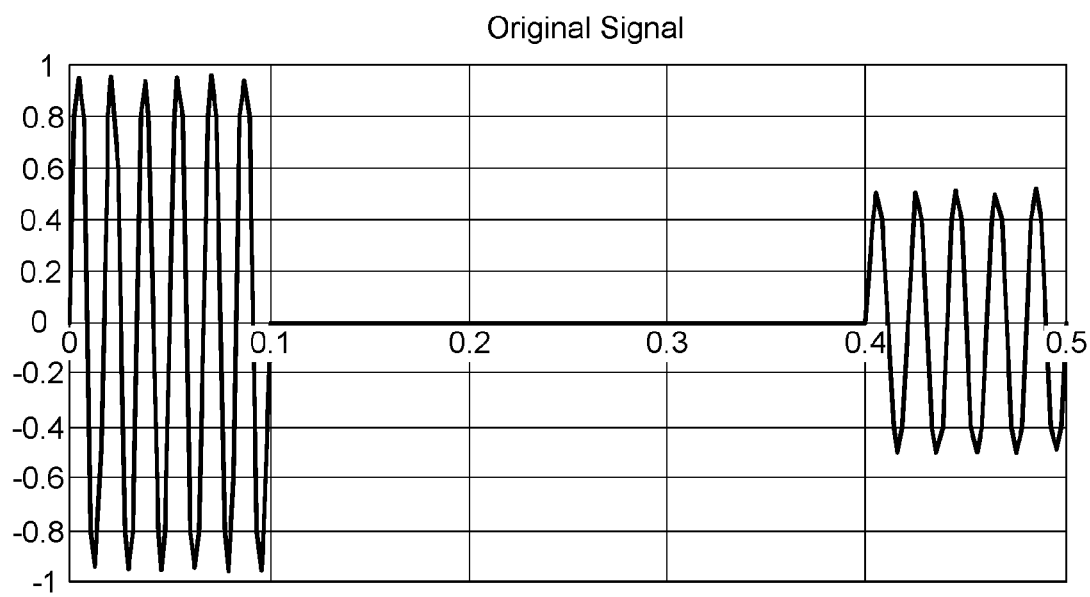
FIGS. 6A and 6B illustrate an example of transcoded haptic effect according to an embodiment based on FIG. 5.
Figure 6B:
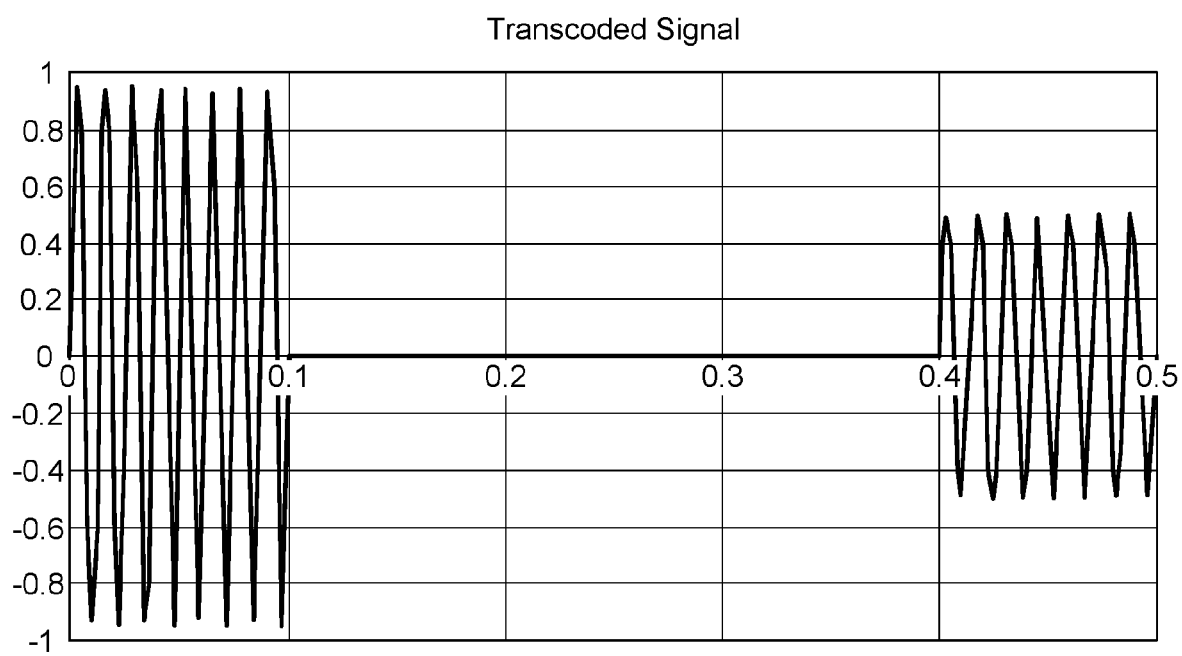

FIGS. 6A and 6B illustrate an example of transcoded haptic effect according to an embodiment based on FIG. 5. FIG. 6A shows the low-level analog signal that was initially defined by the haptic effect and using capabilities of the actuator 1 as reference device. FIG. 6B shows the low-level analog signal as defined by the haptic effect as modified by the process 400 and using capabilities of the actuator 2 as target device. The frequency of the initial low-level analog signal of FIG. 5A was shifted by an offset determined between the resonance frequencies of the references and target devices and results into a modified low-level analog signal of FIG. 5B. In an application in a rendering device, the modified low-level analog signal is provided to the actuator when needed. In a transcoding application, the modified low-level analog signal, or more exactly the corresponding decomposition of the low-level analog signal into bands, streams and keyframes, is then stored in a modified haptic description file, along with the capabilities of the target device.

Figure 7A:
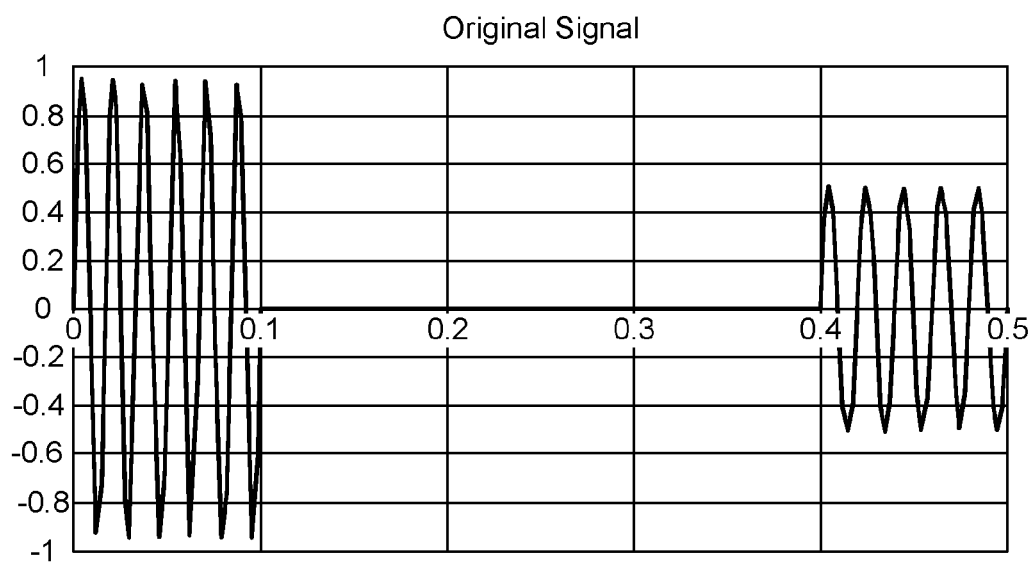
FIGS. 7A and 7B illustrate a second example of haptic effect transcoding according to an embodiment.
Figure 7B:
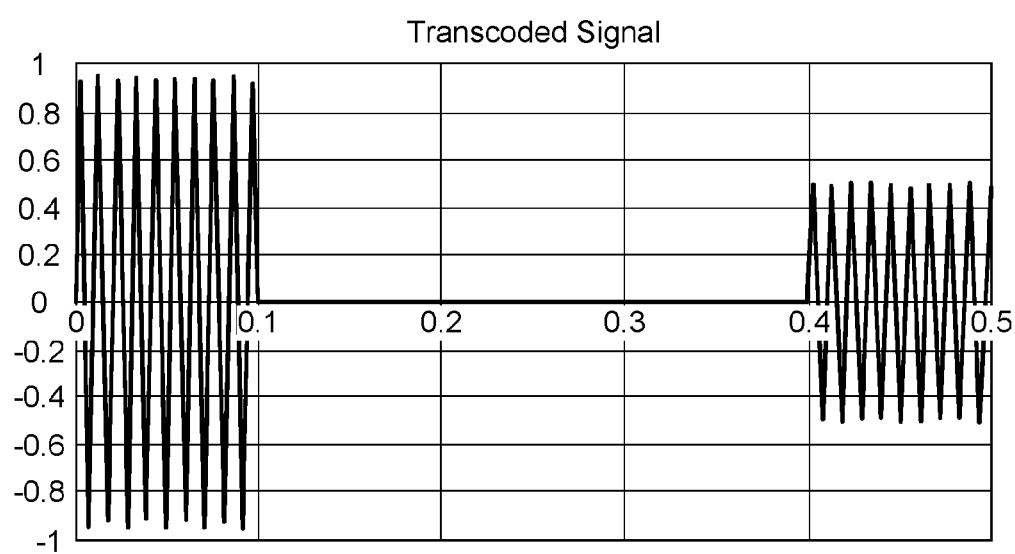

FIGS. 7A and 7B illustrate a second example of haptic effect transcoding according to an embodiment. FIG. 7A shows the low-level analog signal that was initially defined by the haptic effect and using capabilities of a reference device. FIG. 7B shows the low-level analog signal defined by the haptic effect as modified by the process 400 and using capabilities of the target device whose frequency range is different from the frequency range of the reference device: the reference device has a frequency domain of 40 Hz to 280 Hz while the domain range for the target device is 90 Hz to 150 Hz. In this situation, since the frequency ranges (i.e. the minimal and maximal values) are different, the adaptation required is an interpolation. The adaptation is done by interpolating the frequency of the effects from one frequency domain to the other using the following computation:

$$\text{new\_freq} = \frac{(\text{old\_freq} - \text{min\_freq}_1)}{\text{range}_1} \times \text{range}_2 + \text{min\_freq}_2$$

where $\text{range}_1$ and $\text{range}_2$ are respectively the ranges of the frequency domain of the reference and the target device, in this case 240 Hz (280-40) for the reference and 200 Hz (150-90) for the target, $\text{min\_freq}_1$ and $\text{min\_freq}_2$ are respectively the minimum frequencies of the reference and the target device and old_freq refers to the frequency of the effect as defined initially in the low-level signal.

Figure 8A:
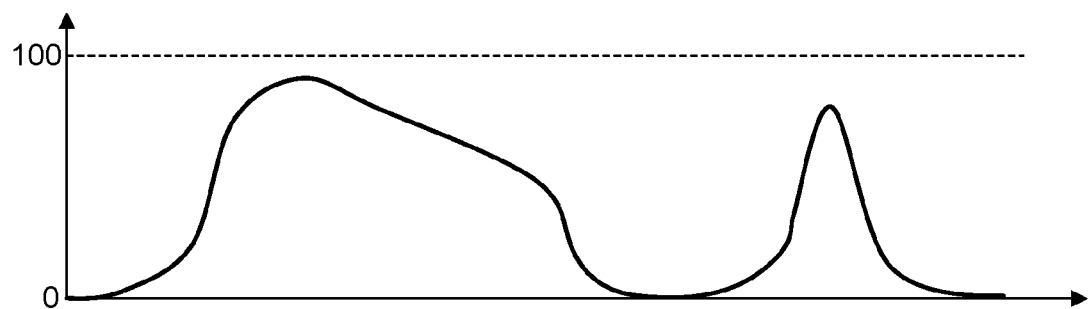
FIGS. 8A and 8B illustrate a third example of haptic effect transcoding according to an embodiment.
Figure 8B:
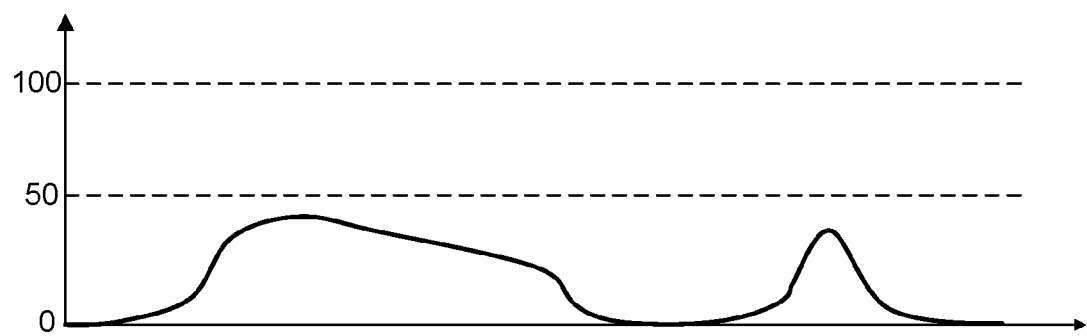

FIGS. 8A and 8B illustrate a third example of haptic effect transcoding according to an embodiment. In this case, the haptic effect would be related to a displacement effect of the actuator. FIG. 8A shows the low-level analog signal that was initially defined by the haptic effect and using capabilities of a reference device, in this case a value of maximal_displacement of 100. FIG. 8B shows the low-level analog signal defined by the haptic effect as modified by the process 400 and using capabilities of the target device whose value of maximal_displacement of 50. In this situation, since the capabilities are related to a maximal value, the adaptation required is scaling. The low-level signal is thus scaled by a ratio of 0.5, representing the ration between the maximal value of the reference device and the maximal value of the target device (i.e. 100/50=0.5).

More advanced adaptation techniques would require additional information such as the frequency range, the weight of the actuator or device, the maximum amplitude, etc. Such information can be provided by the actuators manufacturers and may be included as reference device metadata (for example 331 of FIG. 3) in the proposed format.

Additionally, other information such as the location of the device on the body may also be used to adapt the signal. Another example of adaptation of the haptic effect relates to a haptic effect that was designed (with a specific reference rendering device) to be rendered in the middle of the forearm while the target rendering device has actuators placed at the wrist and elbow instead. In this case, the signal may be adapted to simulate a similar effect by splitting the initial effect into two separate effects to be rendered respectively at the wrist and elbow thus simulating a haptic sensation at the middle of the forearm. While the literature and the research on this sort of signal adaptation remains currently limited, the proposed syntax provides the information to support it.

Based on the same data of FIG. 5 but using a quite tolerant setting of the decision step 440 of FIG. 4, the processor could also decide that no adaptation is required since the values of the resonance frequencies are relatively close. In such configuration, a difference exceeding a threshold of 50% for example would be required to trigger an adaption. Changing the value of such threshold directly impacts the tolerance of the adaptation process.

At least one embodiment proposes a syntax for carrying the capabilities of a reference haptic rendering device. This embodiment is based upon the RM0 specification and uses the corresponding terminology. However, the proposed syntax may be used in other contexts to enable the adaptation of a haptic signal to capabilities of a haptic rendering device.

The highest level of the hierarchy of the haptic file remains unchanged. The notion of reference device is introduced at the signal level. The specifications of every device used in the signal are stored as illustrated in table 1.

TABLE 1

```
{
    "$schema" : "http://json-schema.org/draft-04/schema",
    "title" : "Haptics_signal",
    "type" : "object",
    "properties" : {
        "signal_type": {
            "type": "string",
            "enum": ["Pressure", "Force", "Acceleration", "Velocity",
"Position", "Temperature", "Vibration", "Water", "Wind", "Other"],
            "description": "Type of signal"
        },
        "description": {
            "type": "string",
            "description": "Signal description"
        },
        "reference_devices": {
            "type": "array",
            "description": "List of all devices or actuators used in the signal",
            "items": {
                "type": "object",
                "$ref": "Haptics.reference_device.schema.json"
            }
        },
        "encoding": {
            "type": "string",
            "enum": ["Sinusoidal", "Wavelet"],
            "description": "Type of encoding used for the signal"
        },
        "nb_tracks": {
            "type": "integer",
            "description": "Number of tracks of the signal data",
            "minimum": 0,
            "default": 1
        },
        "avatar_id": {
            "type": "integer",
            "description": "ID of the body model"
        },
        "signal_accessor": {
            "allOf": [ { "$ref": "Haptics_id.schema.json" } ],
            "description": "The index of an accessor containing the data."
        },
        "tracks": {
            "type": "array",
            "description": "List of tracks ",
            "items": {
                "type": "object",
                "$ref": "Haptics.track.schema.json"
            },
            "minItems": 1
        }
    },
    "required": [
        "signal_type",
        "description",
        "encoding",
        "nb_tracks",
        "avatar_id",
        "tracks"
    ]
}
```

Table 2 illustrates an example of syntax (JSON schema) according to an embodiment for defining the capabilities of the reference haptic device, i.e. corresponding to the reference data 330 or more exactly to the reference device metadata 331, 332, 333 of FIG. 3 and thus allowing to adapt a haptic signal to a different haptic rendering device. The list of capabilities illustrated in the figure is not exhaustive and may be completed with other device specifications. For instance, in a case of a force-feedback device, maximum forces (continuous and peak), degrees of freedom, and workspace size will be specified. A thermal device would have the temperature range and inertia specified.

TABLE 2

```
{
  "$schema" : "http://json-schema.org/draft-04/schema",
  "title" : "Haptics_reference_device",
  "type" : "object",
  "allOf": [ { "$ref": "glTFProperty.schema.json" } ],
  "properties" : {
    "device_id": {
      "type": "integer",
      "description": "Id of the device"
    },
    "device_name": {
      "type": "string",
      "description": "Name of the device"
    },
    "body_part_mask": {
      "type": "integer",
      "description": "Binary mask specifying the location of the device or
actuator on the body",
      "minimum": 0,
      "default": 0
    },
    "maximum_frequency": {
      "type": "number",
      "description": "Maximum frequency of the actuator"
    },
    "minimum_frequency": {
      "type": "number",
      "description": "Minimum frequency of the actuator"
    },
    "resonance_frequency": {
      "type": "number",
      "description": "Resonance frequency of the actuator"
    },
    "maximum_amplitude": {
      "type": "number",
      "description": "Maximum acceleration of the device. This is also
referred to as the maximum amplitude"
    },
    "impedance": {
      "type": "number",
      "description": "Impedance of the actuator",
      "minimum": 0.0
    },
    "maximum_voltage": {
      "type": "number",
      "description": "Maximum voltage of the actuator"
    },
    "maximum_current": {
      "type": "number",
      "description": "Maximum current of the actuator",
      "minimum": 0.0
    },
    "maximum_displacement": {
      "type": "number",
      "description": "Maximum displacement of the actuator (mm)."
    },
    "weight": {
      "type": "number",
      "description": "Resonance frequency of the actuator",
      "minimum": −1.0,
      "maximum": 1.0
    },
    "size": {
      "type": "number",
      "description": "Size of the device. Typically, this refers to the
diameter of the actuator."
    },
    "workspace": {
      "X": {
        "type": "number",
        "description": "Size of the device workspace. X-axis in mm."
      },
      "Y": {
        "type": "number",
        "description": "Size of the device workspace. Y-axis in mm."
      },
      "Z": {
        "type": "number",
        "description": "Size of the device workspace. Z-axis in mm."
      }
```

TABLE 2-continued

```
    },
  },
  "resolution": {
    "type": "number",
    "description": "Nominal position resolution in dpi."
  },
  "maximum_force": {
    "type": "number",
    "description": "Maximum exertable force in Newton."
  },
  "continuous_force": {
    "type": "number",
    "description": "Maximum exertable force in Newton."
  },
  "maximum_torque": {
    "type": "number",
    "description": "Maximum exertable force in Newton."
  },
  "continuous_force": {
    "type": "number",
    "description": "Maximum exertable force in Newton."
  },
  "stiffness": [
    "X": {
      "type": "number",
      "description": "Stiffness along X-axis in N/mm."
    },
    "Y": {
      "type": "number",
      "description": " Stiffness along Y-axis in N/mm.."
    },
    "Z": {
      "type": "number",
      "description": " Stiffness along Z-axis in N/mm.."
    },
    "RX": {
      "type": "number",
      "description": "Stiffness around X-axis in N/mm."
    },
    "RY": {
      "type": "number",
      "description": " Stiffness around Y-axis in N/mm.."
    },
    "RZ": {
      "type": "number",
      "description": " Stiffness around Z-axis in N/mm.."
    },
  ],
  "force_output": [
    "X": {
      "type": "boolean",
      "description": "Force capability along X axis."
    },
    "Y": {
      "type": "boolean",
      "description": "Force capability along Y axis."
    },
    "Z": {
      "type": "boolean",
      "description": "Force capability along Z axis."
    },
    "RX": {
      "type": "boolean",
      "description": "Torque capability around X axis."
    },
    "RY": {
      "type": "boolean",
      "description": "Torque capability around Y axis."
    },
    "RZ": {
      "type": "boolean",
      "description": "Torque capability around Z axis."
    },
  ],
  "position_input": [
    "X": {
      "type": "boolean",
      "description": "Position sensing along X axis."
    },
    "Y": {
```

TABLE 2-continued

```
            "type": "boolean",
            "description": "Position sensing along Y axis."
          },
          "Z": {
            "type": "boolean",
            "description": "Position sensing along Z axis."
          },
          "RX": {
            "type": "boolean",
            "description": "Position sensing around X axis."
          },
          "RY": {
            "type": "boolean",
            "description": "Position sensing around Y axis."
          },
          "RZ": {
            "type": "boolean",
            "description": "Position sensing around Z axis."
          },
       ],
       "custom": {
         "type": "number",
         "description": "Additional custom data."
       },
       "type": {
         "type": "string",
         "enum": ["LRA", "ERM", "Piezo", "Voice-coil", "Force-Feedback"],
         "description": "Type of motor of the actuator"
       }
    },
    "required": [
      "device_id",
      "device_name"
    ]
}
```

Properties illustrated in table 2 are defined as follows:
device_id: id of the device or actuator,
device_name: name of the reference device,
body_part_mask: specifies the location of the device on the body,
maximum_frequency: upper limit of the frequency range of the haptic device,
minimum_frequency: lower limit of the frequency range of the haptic device,
resonance_frequency: resonance frequency of the haptic device. It is the frequency at which the device reaches its maximum acceleration,
maximum_amplitude: maximum acceleration that the device can reach,
impedance: Impedance of the device,
maximum_voltage: maximum voltage of the actuator,
maximum_current: maximum current of the actuator,
maximum_displacement: maximum displacement of the actuator,
weight: weight of the actuator,
size: size of the actuator,
type: type of motor of the actuator,
workspace: worskpace size of a force-feedback device,
Resolution: resolution of a force-feedback device,
Maximum force/torque: peak force,
Continuous force/torque: force that can be maintained continuously,
etc.

The table 3 illustrates an example of syntax (JSON schema) according to an embodiment, illustrating the relationship between a haptic track and the corresponding reference device (or actuator). The association is done through the device-Id field that comprises an identifier in the list of reference devices introduced in table 1 and corresponding to the reference data 330 or more exactly to the reference device metadata 331, 332, 333 of FIG. 3.

TABLE 3

```
{
  "$schema" : "http://json-schema.org/draft-04/schema",
  "title" : "Haptics_track",
  "type" : "object",
  "properties" : {
    "id": {
      "type": "integer",
      "description": "Track id"
    },
    "description": {
      "type": "string",
      "description": "Track description"
    },
    "device_id": {
      "type": "integer",
      "description": "Id of the associated device"
    },
    "gain": {
      "type": "number",
      "description": "Gain",
      "default": 1.0
    },
    "mixing_weight": {
      "type": "number",
      "description": "Mixing weight",
      "default": 1.0
    },
    "body_part_mask": {
      "type": "integer",
      "description": "Binary mask specifying body parts on which to apply the effect. One per track",
      "minimum": 0,
      "default": 0
    },
    "vertices": {
      "type": "array",
      "description": "List of vertices on the avatar representation affected by the effect.",
      "items":{
        "type": "interger"
      }
    },
    "bands": {
      "type": "array",
      "description": "List of haptic bands",
      "items": {
        "type": "object",
        "$ref": "Haptics.band.schema.json"
      },
      "minItems": 1
    }
  },
  "required": [
    "id",
    "description",
    "body_part_mask",
    "bands"
  ]
}
```

The following syntax tables illustrate the examples of transcoding described above in relation with FIGS. 5, 6A and 6B. The table 4 describes an initial haptic description file comprising a single track composed of two simple haptic vibratory effects (referred to as streams in this example of the JSON specifications) and that were designed for actuator 1 ('Tactilelabs—Original Haptuator') for which the resonance frequency is 60 Hz.

TABLE 4

```
{
  "version": 1.0,
```

TABLE 4-continued

```
"date": "2021-11-19",
"description":"Example haptic file"
"avatars":[
    {
        "id": 0,
        "lod": 1,
        "type":"Vibration"
    }
],
"shape":0
"signals": [
    {
        "signal_type":"Vibration",
        "description":"Some vibration signal",
        "reference_devices":[
            {
                "device_id":"0"
                "device_name":"Tactilelabs - Original Haptuator",
                "resonance_frequency":60
            }
        ]
        "encoding":"Sinusoidal",
        "avatar_id": 0,
        "tracks":[
            {
                "id":0,
                "description":"Main track",
                "device_id":0,
                "body_part_mask":0,
                "bands":[
                    {
                        "band_type":"Wave",
                        "encoding_modality":"Quantized",
                        "window_length":0.1,
                        "lower_frequency_limit":10,
                        "upper_frequency_limit":100,
                        "streams":[
                            {
                                "position":0,
                                "phase":0,
                                "keyframes":[
                                    {
                                        "amplitude_modulation":0.95,
                                        "frequency_modulation":60
                                    }
                                ]
                            },
                            {
                                "position":0.4,
                                "phase":0,
                                "keyframes":[
                                    {
                                        "amplitude_modulation":0.5,
                                        "frequency_modulation":50
                                    }
                                ]
                            }
                        ]
                    }
                ]
            }
        ]
    }
],
"accessors":[ ],
"buffers":[ ],
"bufferViews":[ ]
}
```

When applying the transcoding process described earlier in relation with FIGS. 5, 6A and 6B, the haptic vibratory effect is transcoded to adapt to the target rendering device using actuator 2 for which the resonance frequency is 80 Hz. The table 5 shows the haptic description file resulting of such transcoding of the initial file represented in table 4. The haptic vibratory effect was modified by shifting the frequency of the vibration by the offset between the resonance frequency of the two devices (i.e. 20 Hz). The metadata of the reference device was also updated with the target device specifications of actuator 2 ('Tactilelabs-Industrial Haptuator') to ensure that further transcoding would use the proper information. For instance, this new haptic file could be transcoded back to the original version by using the original reference device as the target device.

TABLE 5

```
{
    "version": 1.0,
    "date": "2021-11-19",
    "description":"Example haptic file"
    "avatars":[
        {
            "id": 0,
            "lod": 1,
            "type":"Vibration"
        }
    ],
    "shape":0
    "signals": [
        {
            "signal_type":"Vibration",
            "description":"Some vibration signal",
            "reference_device":[
                {
                    "device_id":"0"
                    "device_name":"Tactilelabs - Industrial Haptuator",
                    "resonance_frequency":80
                }
            ]
            "encoding":"Sinusoidal",
            "avatar_id": 0,
            "tracks":[
                {
                    "id":0,
                    "description":"Main track",
                    "device_id":0,
                    "body_part_mask":0,
                    "bands":[
                        {
                            "band_type":"Wave",
                            "encoding_modality":"Vectorial",
                            "window_length":0.1,
                            "lower_frequency_limit":10,
                            "upper_frequency_limit":100,
                            "streams":[
                                {
                                    "position":0,
                                    "phase":0,
                                    "keyframes":[
                                        {
                                            "amplitude_modulation":0.95,
                                            "frequency_modulation":80
                                        }
                                    ]
                                },
                                {
                                    "position":0.4,
                                    "phase":0,
                                    "keyframes":[
                                        {
                                            "amplitude_modulation":0.5,
                                            "frequency_modulation":70
                                        }
                                    ]
                                }
                            ]
                        }
                    ]
                }
            ]
        }
    ],
    "accessors":[ ],
    "buffers":[ ],
    "bufferViews":[ ]
}
```

All elements of information required to perform an adaptation of the haptic effect to the capabilities of a haptic rendering device are carried by the syntax described above as shown in the examples of table 4 and table 5.

The following syntax tables illustrate the examples of transcoding described above in relation with FIGS. 7A and 7B. The table 6 describes an initial haptic description file comprising a single track composed of two simple haptic vibratory effects (referred to as streams in this example of the JSON specifications) and that were designed for "Actuator-1" for which the frequency range is 40 Hz to 280 Hz.

TABLE 6

```
{
  "version": 1.0,
  "date": "2021-11-19",
  "description":"Example haptic file"
  "avatars":[
    {
      "id": 0,
      "lod": 1,
      "type":"Vibration"
    }
  ],
  "shape":0
  "signals": [
    {
      "signal_type":"Vibration",
      "description":"Some vibration signal",
      "reference_devices":[
        {
          "device_id":0"
          "device_name":"Actuator 1",
          "minimum_frequency":40,
          "maximum_frequency":280
        }
      ]
      "encoding":"Sinusoidal",
      "avatar_id": 0,
      "tracks":[
        {
          "id":0,
          "description":"Main track",
          "device_id":0,
          "body_part_mask":0,
          "bands":[
            {
              "band_type":"Wave",
              "encoding_modality":"Quantized",
              "window_length":0.1,
              "lower_frequency_limit":10,
              "upper_frequency_limit":100,
              "streams":[
                {
                  "position":0,
                  "phase":0,
                  "keyframes":[
                    {
                      "amplitude_modulation":0.95,
                      "frequency_modulation":60
                    }
                  ]
                },
                {
                  "position":0.4,
                  "phase":0,
                  "keyframes":[
                    {
                      "amplitude_modulation":0.5,
                      "frequency_modulation":50
                    }
                  ]
                }
              ]
            }
          ]
        }
      ]
```

TABLE 6-continued

```
    }
  ],
  "accessors":[ ],
  "buffers":[ ],
  "bufferViews":[ ]
}
```

As described above in the description of FIGS. 7A and 7B, the low-level signal of the haptic effect of Table 6 may be adapted for rendering on a target device whose frequency range is 40 Hz to 280 Hz, thus performing an adaptation based on an interpolation of the frequencies for the range of the initial reference device as defined in the reference device metadata. The table 7 shows the resulting haptic description file that has been adapted to the capabilities of the target device, where the frequencies have been transposed and where the target device "Actuator-2" is designated as reference device for the adapted haptic effect.

TABLE 6

```
{
  "version": 1.0,
  "date": "2021-11-19",
  "description":"Example haptic file"
  "avatars":[
    {
      "id": 0,
      "lod": 1,
      "type":"Vibration"
    }
  ],
  "shape":0
  "signals": [
    {
      "signal_type":"Vibration",
      "description":"Some vibration signal",
      "reference_device":[
        {
          "device_id":0"
          "device_name":"Actuator 2",
          "minimum_frequency":90,
          "maximum_frequency":150
        }
      ]
      "encoding":"Sinusoidal",
      "avatar_id": 0,
      "tracks":[
        {
          "id":0,
          "description":"Main track",
          "device_id":0,
          "body_part_mask":0,
          "bands":[
            {
              "band_type":"Wave",
              "encoding_modality":"Vectorial",
              "window_length":0.1,
              "lower_frequency_limit":10,
              "upper_frequency_limit":100,
              "streams":[
                {
                  "position":0,
                  "phase":0,
                  "keyframes":[
                    {
                      "amplitude_modulation":0.95,
                      "frequency_modulation":77
                    }
                  ]
                },
                {
                  "position":0.4,
                  "phase":0,
                  "keyframes":[
                    {
```

TABLE 6-continued

```
          "amplitude_modulation":0.5,
          "frequency_modulation":61
        }
      ]
    }
  ]
}
              ]
            }
          ]
        }
      ]
    }
  ],
  "accessors":[ ],
  "buffers":[ ],
  "bufferViews":[ ]
}
```

Although different embodiments have been described separately, any combination of the embodiments together can be done while respecting the principles of the disclosure.

Although embodiments are related to haptic effects, the person skilled in the art will appreciate that the same principles could apply to other effects such as the sensorial effects for example and thus would comprise smell and taste. Appropriate syntax would thus determine the appropriate parameters related to these effects.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Additionally, this application or its claims may refer to "obtaining" various pieces of information. Obtaining is, as with "accessing", intended to be a broad term. Obtaining the information may include one or more of, for example, receiving the information, accessing the information, or retrieving the information (for example, from memory or optical media storage). Further, "obtaining" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The invention claimed is:

1. A method comprising:
   obtaining haptic data for a haptic effect, the haptic data comprising information representative of:
      metadata related to capabilities of a reference rendering device for which the haptic effect was designed for, and
      a description of a low-level signal for rendering the haptic effect when provided to the reference rendering device,
   obtaining metadata related to capabilities of a target rendering device,
   comparing the capabilities of the reference rendering device to the capabilities of the target rendering device,
   based on the comparison, determining if an adaptation of the low-level signal is to be performed and responsively adapting the low-level signal to the capabilities of the target rendering device, and
   providing the adapted low-level signal to the target rendering device.

2. The method of claim 1, further comprising providing an adapted low-level signal to a haptic actuator of the target rendering device for rendering the haptic effect.

3. The method of claim 1 wherein the description of the low-level signal is described by a set of waves bands comprising a set of streams comprising a set of keyframes.

4. The method of claim 1, wherein the capabilities of the reference rendering device and the capabilities of the target rendering device are selected from a set of capabilities comprising frequency range, amplitude of displacement, maximal acceleration, resonating frequencies, dynamic range, location on a body, weight, size, type of motor, maximum voltage, maximum current, impedance.

5. The method of claim 1, wherein adapting the low-level signal is done by linear scaling.

6. The method of claim 1, wherein adapting the low-level signal is done by using interpolation.

7. The method of claim 1, wherein adapting the low-level signal is done by using frequency transposition.

8. The method of claim 1, wherein adapting the low-level signal is done by using frequency range scaling.

9. A device comprising a processor configured to, for a haptic effect:
   obtain haptic data for the haptic effect, the haptic data comprising information representative of:
      metadata related to capabilities of a reference rendering device for which the haptic effect was designed for, and
      a description of a low-level signal for rendering the haptic effect when provided to the reference rendering device,
   obtain metadata related to capabilities of a target rendering device,
   compare the capabilities of the reference rendering device to the capabilities of the target rendering device,
   based on the comparison, determine if an adaptation of the low-level signal is to be performed and responsively adapting the low-level signal to the capabilities of the target rendering device, and
   provide the adapted low-level signal to the target rendering device.

10. The device of claim 9, wherein the device is the target rendering device and wherein the processor is further configured to provide the adapted low-level signal to a haptic actuator for rendering the haptic effect.

11. The device of claim 9, wherein the description of the low-level signal is described by a set of waves bands comprising a set of streams comprising a set of keyframes.

12. The device of claim 9, wherein the capabilities of the reference rendering device and the capabilities of the target rendering device are selected from a set of capabilities comprising frequency range, amplitude of displacement, maximal acceleration, resonating frequencies, dynamic range, location on a body, weight, size, type of motor, maximum voltage, maximum current, impedance.

13. The device of claim 9, wherein adapting the low-level signal is done by linear scaling.

14. The device of claim 9, wherein adapting the low-level signal is done by using interpolation.

15. The device of claim 9, wherein adapting the low-level signal is done by using frequency transposition.

16. The device of claim 9, wherein adapting the low-level signal is done by using frequency range scaling.

17. A non-transitory computer readable storage medium having stored instructions that, when executed by a processor, cause the processor to:
 obtain haptic data for the haptic effect, the haptic data comprising information representative of:
  metadata related to capabilities of a reference rendering device for which the haptic effect was designed for, and
  a description of a low-level signal for rendering the haptic effect when provided to the reference rendering device,
 obtain metadata related to capabilities of a target rendering device,
 compare the capabilities of the reference rendering device to the capabilities of the target rendering device,
 based on the comparison, determine if an adaptation of the low-level signal is to be performed and responsively adapting the low-level signal to the capabilities of the target rendering device, and
 provide the adapted low-level signal to the target rendering device.

* * * * *